J. E. DE BISSCHOP.
GRADE LEVEL.
APPLICATION FILED APR. 12, 1910.
970,472.
Patented Sept. 20, 1910.
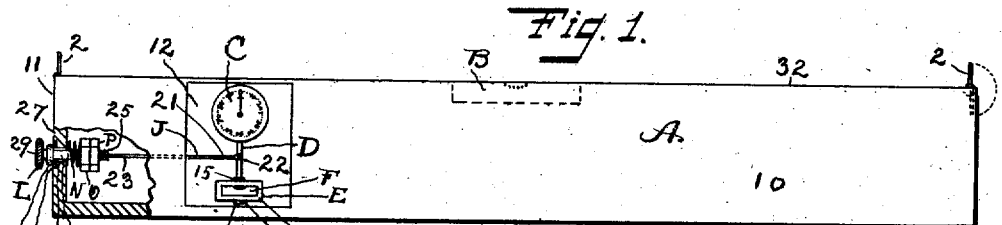
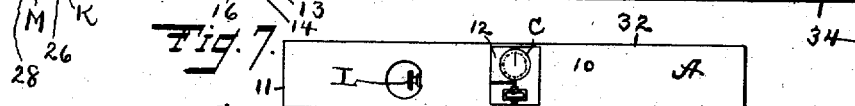
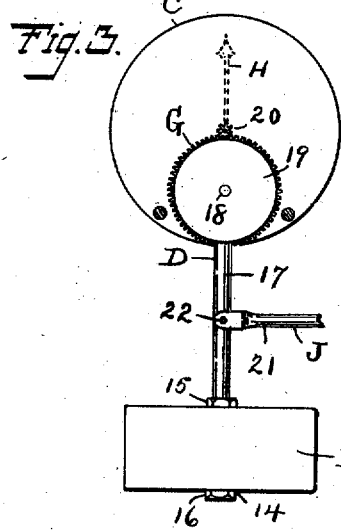 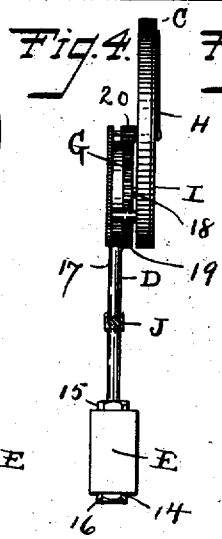 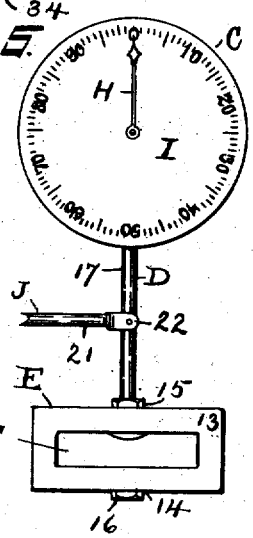
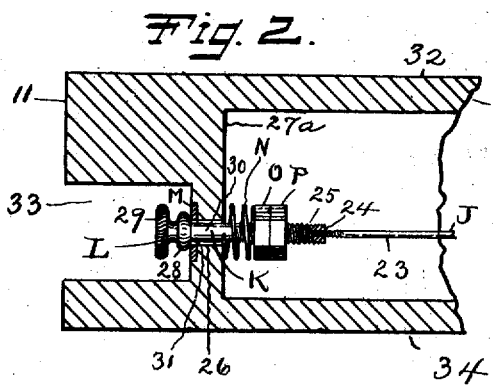 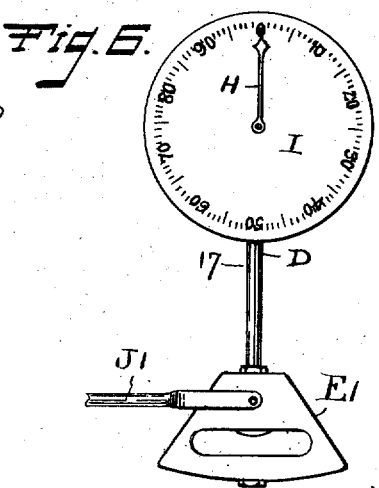
Witnesses:
S. H. Clarke
N. L. Lockwood
Inventor
Joseph E. De Bisschop
By Louis M. Schmidt
Atty.

UNITED STATES PATENT OFFICE.

JOSEPH E. DE BISSCHOP, OF NEW BRITAIN, CONNECTICUT.

GRADE-LEVEL.

970,472. Specification of Letters Patent. Patented Sept. 20, 1910.

Application filed April 12, 1910. Serial No. 554,924.

*To all whom it may concern:*

Be it known that I, JOSEPH E. DE BISSCHOP, a citizen of the United States, residing at New Britain, in the county of Hartford and State of Connecticut, have invented certain new and useful Improvements in Grade-Levels, of which the following is a specification.

My invention relates to improvements in grade levels, and the objects of my improvements are simplicity and economy in construction and convenience and efficiency in use.

In the accompanying drawing: Figure 1 is a side elevation of a level provided with my invention, in part broken out and in section. Fig. 2 is a sectional view of the end of a modification of the frame shown in Fig. 1, the locking device being in side elevation, on an enlarged scale. Fig. 3 is a rear view of some of the parts shown in Fig. 1. Fig. 4 is an edge view of the same. Fig. 5 is a front view of the same. Fig. 6 is a view similar to that shown in Fig. 5 of a modification. Fig. 7 is a side elevation of a modification, on a scale smaller than that of Fig. 1.

A is a grade level embodying my invention and comprises the frame or body 10 generally formed after the manner of the usual form of frame for an ordinary level for carpenters' and masons' use, and as shown comprises a long piece of wood of rectangular cross section of considerable depth relatively to the thickness and the same is provided at the center with the usual spirit indicator B, visible for reading at the top. At some convenient point, as intermediate the said spirit indicator B and the end 11 of the frame 10 there is provided a recess 12 for housing a grade indicator C to be described. The said grade indicator C comprises a pendent arm or rod D provided at its lower end with a block or frame E serving as a means of support for a grade spirit indicator F which is essentially a spirit indicator such as is used in general in levels such as the said spirit indicator B. The said pendent block or frame E is preferably of symmetrical construction and has the said spirit indicator mounted symmetrically in the front face 13 as shown in Fig. 1, and is pierced vertically by a screw-threaded hole adapted to receive the threaded lower end 14 of said arm D. Lock nuts 15 and 16 may coöperate to secure the said block E at any position desired convenient for inspection and reading the said grade spirit indicator F. The said pendent rod or arm D is supported by its upper end 17 on a shaft 18 which is pivotally mounted and is operatively connected by a train of gears G comprising a driving gear 19 on the shaft 18 and a pinion 20 with an index finger H which indicates on a dial I the deviations of the body 10 from the horizontal or zero position in a manner to be described. At some convenient point, which may be intermediate the said block E and shaft 18 along the length of the arm 17 and preferably adjacent the said block E, there is attached to the arm 17 the inner end 21 of a connecting rod J of a locking device, which may be connected to the said arm by a pivotal joint 22. The outer end 23 of the said connecting rod J of the locking device is connected to some means for holding it essentially rigidly in a definite fixed position. As shown the said outer end 23 is screw-threaded and is received in the internally screw-threaded hole or bore 24 of the inner end 25 of a sleeve K extending through a lateral bore 26 in the side wall 27 of the said frame 10 and which on the outer end is provided with a head L which bears indirectly on the side wall 27 by means of a bearing washer M. The said head L has a knurled outer end 29 convenient for handling and on the inner end has a shoulder 28 that is rounded on the under side, and the hole 31 in the said washer M is a loose fit for the body 30 of the said sleeve K, and there is clearance between the said body 30 and the said lateral hole 26 in the side wall 27. The said head L and washer M constitute essentially a ball and socket joint, and permit of a change in the angular direction of the said sleeve K and connecting rod J at different conditions of adjustment. The said head L is held in essentially rigid contact with the said washer M so as to hold the said pendent rod D in any position desired as determined by the connecting rod J screwed into the sleeve K by means of a spring N which has its outer end bearing against the inner side of the said side wall 27 and its inner end bearing against a nut O screwed onto the exterior of the said sleeve K and which may be held in place by a lock nut P.

In use with the frame 10 of the level A in the level position corresponding to the position of level for the bottom surface 34 and in which position the spirit indicator B would indicate level in the usual way, the grade spirit indicator F is brought to the position to indicate the level position by turning the head L of the locking device and in which position the index finger H indicates zero on the dial I. Tilting the said body 10 to a deviation from the level position changes the indications of the spirit indicators. In the case of the grade spirit indicator F the same may be brought to the original level position again by turning the said adjusting head L either clockwise or counter clockwise according to the amount and direction of the said deviation, corresponding to the amount of change in the rod D. By turning the head L as described there will be a deviation of the reading of the said index H on the dial I, which when properly calibrated will give a measure of the angular deviation of the said level A from the original level position. Accordingly, by sighting along the level at a distant point the angular deviation of the same from the level may be determined and with the distance known the amount of rise or fall may be determined in a well known manner. As it is more convenient to sight along the top line than the bottom line of level such as shown in Fig. 1, the said top line 32 must be parallel with the bottom line 34 to obtain the best results without other special contrivances. Sights 2 of a simple character may be provided at each end with which accurate results may be easily obtained and which may be pivotally mounted on a hinge joint so that they may be turned down and embedded in a housing in the wall and out of the way when not in use. The side wall 27$^a$ may be recessed as at 33 to admit and house the said head L and washer M of the locking device and protect the said head from liability of accidental disturbance or injury.

In the modification shown in Fig. 6 the connecting rod J$^1$ is connected directly to the block or frame E$^1$.

By the device described an instrument is provided that is simple in construction and operation and is readily applicable to obtain a quick and satisfactory result for determining a grade or fall, as for instance to enable a farmer to determine whether or not a brook can be utilized to deliver water to his house.

The grade spirit indicator described is essentially an attachment that may be incorporated as a part of a level of the ordinary type. The same may be employed however without the ordinary spirit indicator as shown in Fig. 7. In this construction the grade spirit indicator may be located at the middle of the length of the body as shown.

With my device an observation may be taken and the index will be locked in accordance with the same, so that the reading may be taken at any time when convenient.

I claim as my invention:

A grade level having a pair of sighting points, a dial fixed relatively to the said points, an index finger pivotally mounted on a shaft so as to indicate on said dial deviations from the level position of the said points, a pinion on said shaft, a gear wheel pivotally mounted so as to mesh with the said pinion, a rod secured to and projecting downwardly from the said gear wheel, a spirit indicator mounted on the lower end of the said rod, a connecting rod pivotally connected to said rod by one of its ends, and adjusting mechanism on the other end of said connecting rod and connected to said body, the said adjusting mechanism being adapted to permit the adjustment of the effective length of the said connecting rod.

JOSEPH E. DE BISSCHOP.

Witnesses:
HENRY O. SCHMIDT,
H. E. BROPSON.